(No Model.) 6 Sheets—Sheet 1.

J. GANSS.
TIME STAMP.

No. 486,458. Patented Nov. 22, 1892.

Witnesses:
D. W. Gardner
W. A. Pollock

Inventor:
Jacob Ganss,
By his Attorney
Geo. W. Miatt (No Model.)  6 Sheets—Sheet 2.

J. GANSS.
TIME STAMP.

No. 486,458.  Patented Nov. 22, 1892.

Witnesses:
D. W. Gardner
H. A. Pollock

Inventor:
Jacob Ganss
By his Attorney
Geo. W. Miatt

(No Model.) 6 Sheets—Sheet 3.
J. GANSS.
TIME STAMP.

No. 486,458. Patented Nov. 22, 1892.

Witnesses:
D. W. Gardner
W. A. Pollock

Inventor:
Jacob Ganss,
By his Attorney
Geo. W. Miatt (No Model.) 6 Sheets—Sheet 4.

J. GANSS.
TIME STAMP.

No. 486,458. Patented Nov. 22, 1892.

Witnesses:
D. W. Gardner
W. A. Pelock

Inventor:
Jacob Ganss,
By his Attorney
Geo. W. Miatt

THE NORRIS PETERS CO., PHOTO-LITHO., WASHINGTON, D. C.

(No Model.) 6 Sheets—Sheet 5.

J. GANSS.
TIME STAMP.

No. 486,458. Patented Nov. 22, 1892.

Witnesses.
D. W. Gardner
W. A. Pollock

Inventor.
Jacob Ganss,
By his attorney
Geo. W. Miatt (No Model.) 6 Sheets—Sheet 6.

J. GANSS.
TIME STAMP.

No. 486,458. Patented Nov. 22, 1892.

Witnesses:
O. W. Gardner
H. A. Pollock

Inventor:
Jacob Ganss,
By his Attorney
Geo. W. Miatt

THE NORRIS PETERS CO., PHOTO-LITHO., WASHINGTON, D. C.

UNITED STATES PATENT OFFICE.

JACOB GANSS, OF BROOKLYN, NEW YORK.

TIME-STAMP.

SPECIFICATION forming part of Letters Patent No. 486,458, dated November 22, 1892.

Application filed June 27, 1889. Serial No. 315,794. (No model.)

*To all whom it may concern:*

Be it known that I, JACOB GANSS, a citizen of the United States, and a resident of the city of Brooklyn, county of Kings, and State of New York, have invented certain new and useful Improvements in Time-Stamps, so called, of which the following is a specification.

The object of my invention is to simplify the mechanism of time-stamps and to provide movements and arrangements of the parts whereby greater compactness, accuracy, regularity, durability, and economy may be secured. I attain these objects by the use of the mechanism hereinafter described, reference being had to the accompanying drawings, in which—

A is a base supporting the mechanism, and $a\ a'\ a^2\ a^3\ a^4$ are casing-plates.

C is a standard supporting an ordinary vertical spring-plunger D, connected, preferably, by ball-and-socket joints $e$ with a platen E.

G is an ordinary inking-ribbon interposed between type-bed F and the platen E, wound upon spindles $G'\ G^2$, passing through ribbon-boxes $G^3\ G^4$, all these parts being operated in the usual manner.

An ordinary clock-movement H (non-essential parts being omitted in the drawings) regulates the mechanism, the motive power being furnished by springs in the usual manner; but any other convenient motive power might be employed.

$h^2$ is the main shaft of the clockwork and is coupled to one end of the driving-shaft I by my improved coupling, which consists, essentially, in providing one shaft with radially-projecting pins $h^5\ h^5$ and the other with bifurcated arms $i^2\ i^2$, between each of which one of the radial pins project, and, if preferred, as shown in the drawings, a bifurcated end piece $h^3$ may be attached to one shaft, between the arms of which is pivoted a disk or ring $h^4$, upon which may be carried the said pins $h^5$ $h^5$. Any other form of coupling adapted to yield in any direction might be used.

J is a crown-wheel sleeved upon shaft I and connected therewith by a spring $i^5$. A pin $j'$ on wheel J is normally held in engagement against a radial arm $i^3$ on shaft I by pressure of said spring $i^5$. Should the rotation of wheel J be arrested shaft I will thus continue to revolve, and on release of wheel J spring $i^5$ will return it to normal position relative to the shaft.

Wheel J has seventy teeth engaging with pinion $k$, having fourteen teeth on lower end of shaft K, suitably supported, on upper end of which is pinion $k^2$, having twelve teeth meshing with sixty teeth upon periphery of minute-dial wheel $K^2$, bearing types indicating the sixty minutes, which is thus caused to rotate once in each hour simultaneously with driving-shaft I. $K^2$ and its connections are shown separated from the rest of the apparatus in Fig. 12 of the drawings. Dial-wheel $K^2$ is supported and revolves upon the top plate $a^4$, and is centralized against lateral displacement by open circular shoulder or box $m$, around which it rotates.

To the outer end of the driving-shaft I is mounted the minute hand $i^5$. Sleeved thereon in the usual manner are the hour-hand $i^4$ and the calendar-index $i^6$, all acting in conjunction with the dial $i^7$ on front plate $a$.

Hour-hand is mounted upon sleeve $i^8$, which is rotated upon the shaft I by pinion $i^9$, rigidly attached upon latter and acting through intermediate gear and pinion $i^{10}$ $i^{11}$ upon gear-teeth $i^{12}$, upon said minute-hand sleeve. Day-index $i^6$ is fixed to outer end of sleeve N, which in turn surrounds sleeve $i^8$ and is moved once in twenty-four hours by engagement of its spur-wheel $n$ with pinion $n'$ on forward end of counter-shaft N', on rear of which is pinion $n^2$, actuated by day-printing wheel $N^3$, the teeth of the pinion $N^3$ being so arranged that pinion $n^2$ is advanced a single tooth for each movement of the day-printing wheel.

By a disk O, attached to shaft I, are carried two lateral projections $o$ $o'$. Projection $o$ at each rotation of shaft I engages with one of the twenty-four ratchet-teeth upon an intermediate wheel P. The intermediate wheel P also carries a projecting pin $p$, which at each revolution of P moves index-wheel P' one tooth. Thus P' being provided with seven teeth, index $p^2$, attached to outer end of shaft $p'$, will be moved forward once at each revolution of P or every twenty-four revolutions of I, and thus once in every twenty-four hours, whereby said index $p^2$ is caused to point successively to the names of the different days of the week on outer dial $p^3$.

Figures 6, 7:
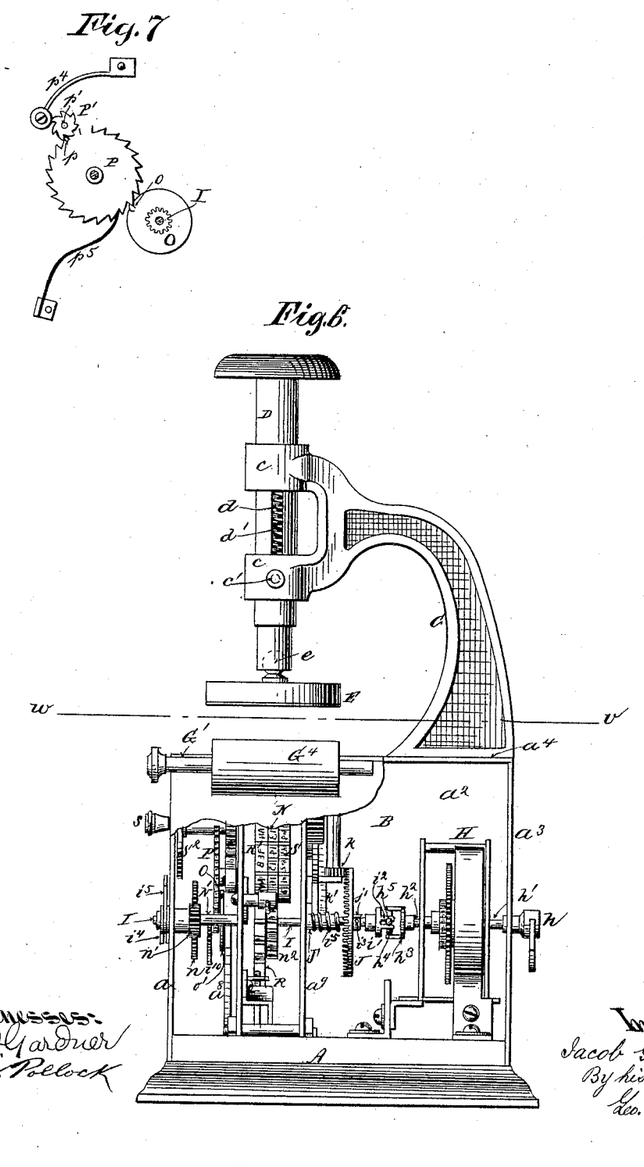
Fig. 6 is a side elevation, one of the side plates being broken away.
Fig. 7 is a detail view of parts connected with index designating day of the week.
Figure 9:
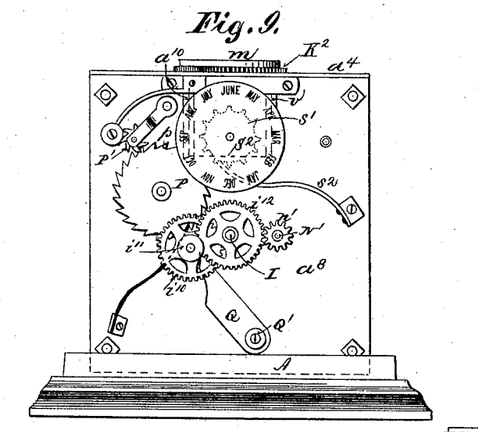
Fig. 9 is a front elevation of the interior supporting-frame, &c., outer casing being removed.
Figure 14:
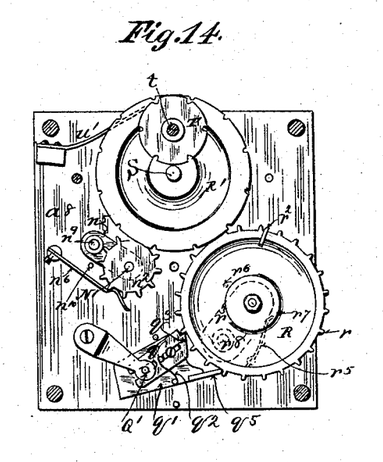
Fig. 14 is an elevation of back side of front plate.
Figure 15:
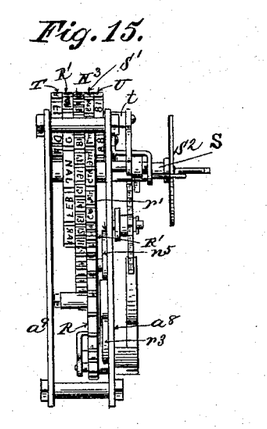
Fig. 15 is a side elevation of interior supporting-frame removed from the casing.
Figure 16:
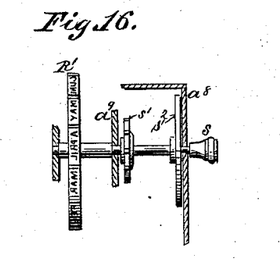
Fig. 16 is a detail of index and wheel and connections for printing and indicating day of month.

Fig. 7 represents a detail view of the parts referred to in the act of changing. P P' are held against disarrangement by spring-detents $p^4$ $p^5$. The other projection $o'$ at each revolution of disk O engages against tripping lever-arm Q and depresses it against the stress of spring $w'$, secured to inner plate at $r^{20}$. Q is attached to front end of rock-shaft Q', on inner end of which sliding pawl $q$ is arranged to engage with a tooth of motor-wheel R at each reciprocation of Q'. Various pawl devices might be used; but I prefer that which is illustrated in the drawings, particularly at Fig. 14. On arm $q'$, which is attached to the inner end of rock-shaft Q', I mount a movable piece $q$. The rock-shaft Q' and also a pin secured to arm $q'$ pass through longitudinal slots in this sliding piece or pawl, which thus lies between the arm $q'$ and the bracket in which turns the rock-shaft. The sliding pawl is provided with an inclined or beveled edge $q^3$ and is held constantly in contact with the motor-wheel R by means of a spring $q^2$. At each depression of the arm $q'$, caused by the tripping-lever Q actuating the rock-shaft Q', the inclined or beveled edge $q^3$ is brought into contact with one of the teeth of the motor-wheel R, and thus the sliding pawl $q$ is caused to slide backward the distance that one of said teeth projects from the said motor-wheel, and on passing the tooth is released from its pressure and projected forward by the spring $q^2$, so as to make a firm engagement with the tooth, which it then carries forward as the arm $q'$ moves upward on the tripping-lever Q being released from the pressure of the projection $o$ and restored to normal position by the stress of the spring $w'$. The arm $q'$ is also provided with a rigid projection $q^5$, which prevents the escape of more than one tooth of the motor-wheel R at each vibration of the tripping-lever Q. It is of course evident that without departing from my invention any equivalent of the spring $q^2$ might be employed—as, for instance, the position of the parts might be changed so as to apply them to the upper instead, of as at present, to the lower portion of the motor-wheel R—whereby gravity, instead of said spring $q^2$, might be employed to effect the return slide of the pawl into engagement with the tooth of the said motor-wheel. The periphery of the motor-wheel R is provided with twenty-four equidistant projecting teeth, which engage twenty-four corresponding nicks $n^4$ in periphery of hour-printing wheel S', and which nicks in this case are situated between types designating the twenty-four hours of the day. The hour-wheel S', is supported by and turns freely upon shaft S, and is thus advanced one notch at each revolution of main-shaft I, whereby the type designating the proper hour will be at the right time brought into position for printing.

In the mechanism shown I have designated the hours consecutively from "1" to "24;" but it is obvious that the conventional method of indicating the hours, as of "a. m." or "p. m.," might be employed, it being only necessary to cut the type-faces accordingly.

Figures 1, 8, 20:
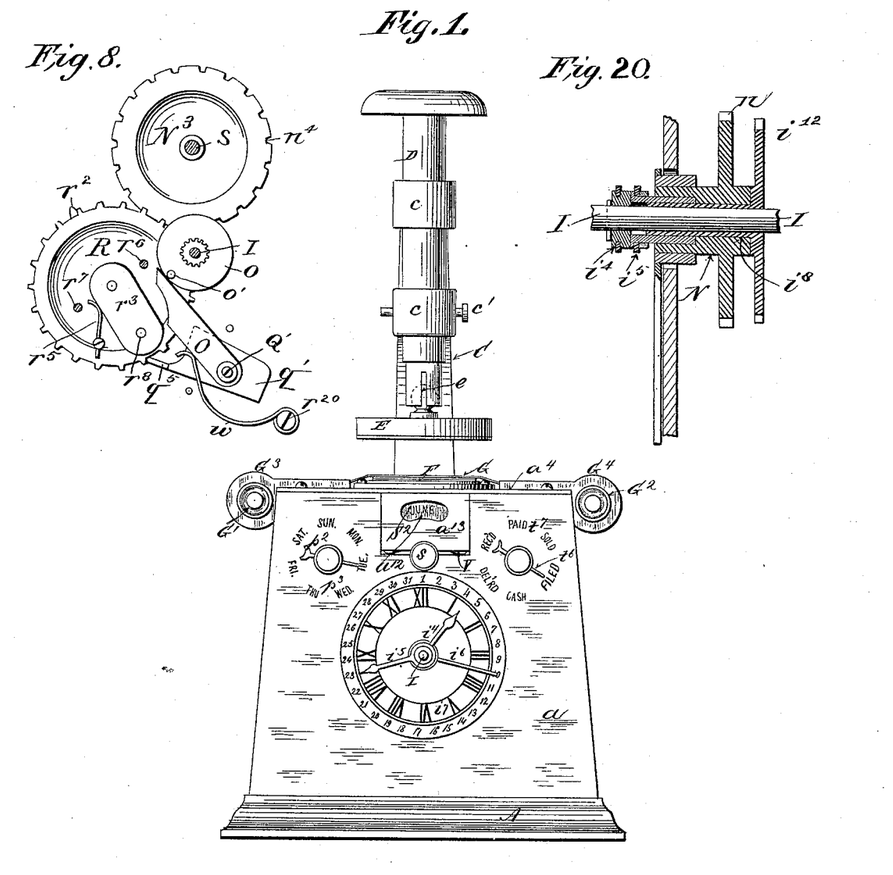
Figure 1 is a front elevation of a time-stamp containing my improvements.
Fig 8 is a detail view of portion of mechanism for changing hour-printing wheel.
Fig. 20 is a detail view, on a larger scale in section, of certain of the parts shown at the left in Fig. 4—to wit., $i^4\ i^5$ $i^6$—and of the parts by means of which they are driven.
Figure 2:
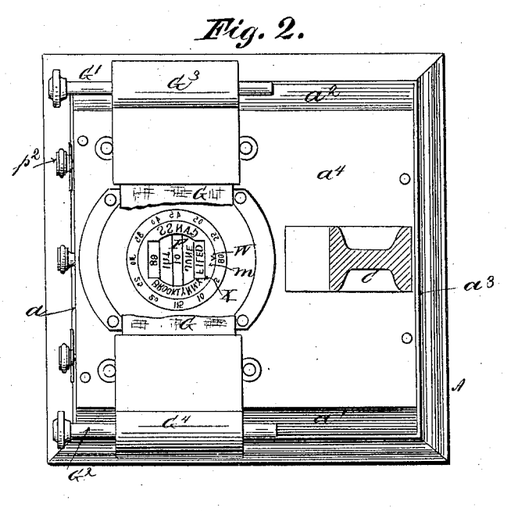
Fig. 2 is a horizontal section upon plane of line $w\ v$, Fig. 6, the inking-ribbon being broken away.
Figure 3:
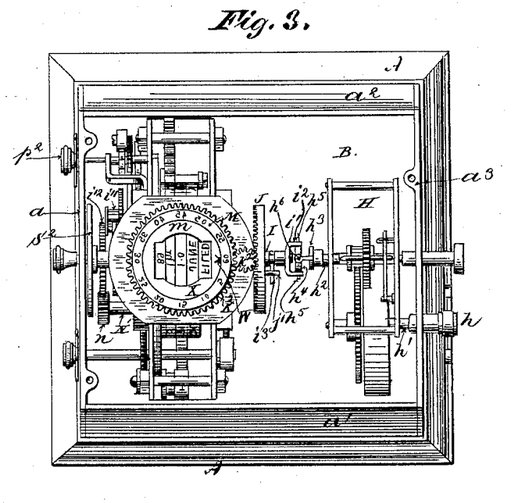
Fig. 3 is a plan of the parts within the casing.

Fig. 8 shows a detail view of the hour-printing-wheel mechanism.

Figures 17, 18:
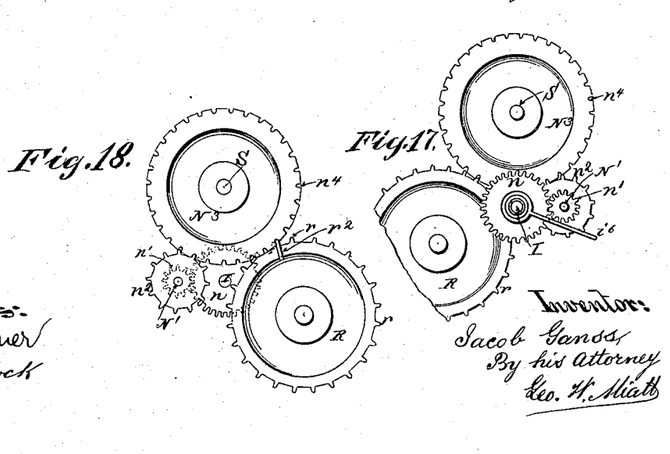
Fig. 17 is a detail front view of mechanism for printing day of month.
Fig. 18 is a rear view of Fig. 17.
Figure 19:
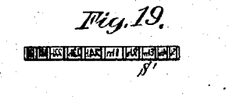
Fig. 19 is an edge view of hour-printing wheel, illustrating numbering hours from "1" to "24," consecutively.

Fig. 18 and 19 illustrate the connection of the motor-wheel R with the day-printing wheel, and through the latter with the day index in the front of the apparatus. The motor-wheel R carries a single tooth or projection $r^2$, Fig. 19, upon its side in line with the day wheel $N^3$. Projection $r^2$ engages with one of the notches $n^4$, Fig. 8, at each revolution of the motor-wheel R, thereby advancing wheel $n^3$ one notch and bringing the type representing a new day of the month into position for printing-wheel $N^3$, being also free to rotate upon shaft S. This rotation of day-wheel $N^3$ operates to change the position of pointer $i^6$ with relation to dial $i^7$ through the gears $n$ $n'$ $n^2$, as will be readily understood.

The motor-wheel R is mounted upon an arm $r^3$, Fig. 8, which is by the pivot $r^8$ secured to the frame-plate $a^8$, which latter is not shown in the drawings. The arm $r^3$ is thus provided with a bearing fixed to the frame-plate, while the other end of the arm $r^3$ is free to vibrate, carrying with it the motor-wheel R, the extent of this vibration being limited by stops $r^6$ $r^7$, which are also fixed to the frame-plate, and which, like the pivot $r^8$, are in Fig.

8 shown in cross-section, the drawings representing the frame-plate $a^8$ as being cut away and removed, and it being understood that the stops $r^6$ $r^7$ and the pivot $r^8$ are not attached to motor-wheel R. The motor-wheel R, thus mounted upon and supported by the vibrating arm $r^3$, is pressed into engagement with the printing-wheel $N^3$ by the spring $r^5$. The toothed gear-wheel $n^2$, Figs. 18 and 19, is similarly mounted upon a vibrating arm $n^5$, Fig. 14, pivoted at one of its extremities to the frame-plate $a^8$ by pivot $n^9$. The extent of vibration of the arm $n^5$ is also limited by the stop $n^{10}$, and the toothed gear-wheel $n^2$ is pressed into engagement with the day-printing wheel $N^3$ by the spring $n^6$. By thus mounting the wheels upon movable bearings adapted to yield while the teeth are approaching, passing across, and leaving a line drawn between the center of such wheel and the center of the wheel $N^3$, bearing notches $n^4$ in which the teeth of said wheels engage, it is possible to greatly reduce the size of the notches and of the teeth as compared to ordinary gearing. The action of the wheels is also eased. The wheels are substantially locked between movements, the teeth bearing upon the notches substantially only while crossing the line between the centers of the toothed wheels and the wheel $N^3$, and the printing-wheel $N^3$ is caused to spring forward periodically in its rotation during the brief period in which the center line is crossed by the teeth, as aforesaid. Thus the printing-wheel rotates step by step, and each type is in turn brought by a quick forward movement into the required position for printing where it remains until the next movement occurs.

The notches $n^4$ of the wheel $N^3$, as well as the similar notches of the wheel R, are of less depth than the teeth $r$ of the wheel R, and then the teeth of the wheel $n^2$, whereby the peripheries of the wheels R and $n^2$ are kept from actual contact with the peripheral printing-types. It is thus possible to reduce the size of printing-wheels to that absolutely required by the printing-characters and their proper intervals of separation, whereas in former systems of gearing wheels together the space required for the notches necessarily consumed about half of the peripheral surface, which by my method is available for the types. It is also noticeable that my method dispenses with intermediate chains of gearing, and my apparatus is rendered more durable, less liable to derangement, and much smaller and more compact.

Figure 4:
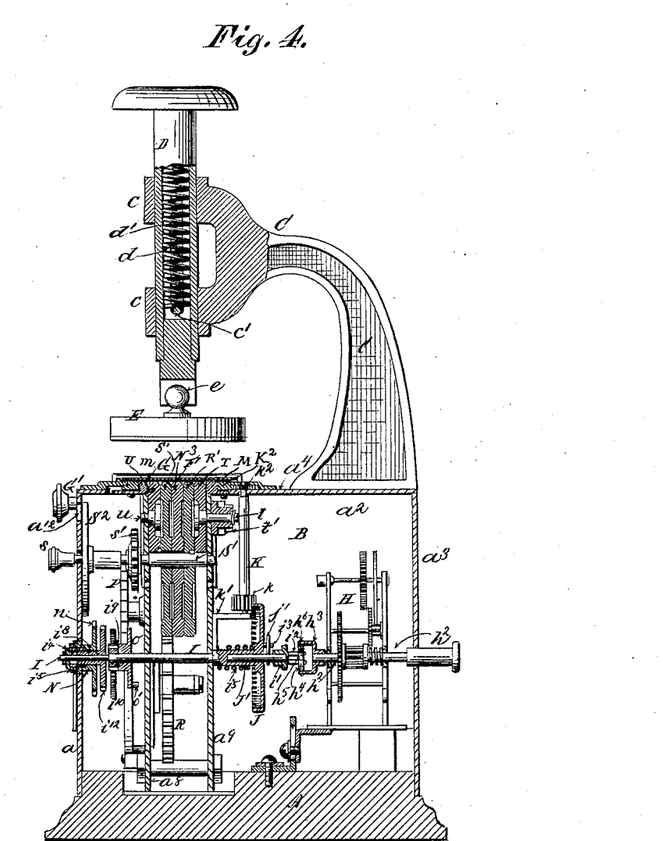
Fig. 4 is a central vertical section showing certain parts in elevation.
Figure 5:
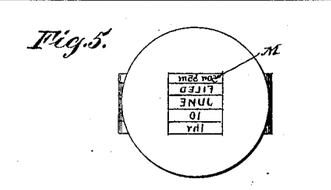
Fig. 5 is a plan view of modified arrangement of the printing-types.

Shaft S, rotating in bearings in the two frame-plates $a^8$ $a^9$, as well as in the front plate $a$, through which it extends, supports the hour-wheel $S'$ and the day-wheel $N^3$, which are loose and rotate thereon, and the month-wheel $R'$, fixed thereto and rotating therewith, and is provided with a knob $s$ to facilitate rotation from exterior. On shaft S is secured month-index disk $S^2$, carrying names of the months in position and order arranged to coincide with the corresponding types on periphery of month-printing wheel $R'$. Through a slot $a^{12}$ in front plate $a$ (see Figs. 1 and 4) a portion of disk $S^2$ is exposed, thus providing index of position of month-printing wheel. $R'$ and $S^2$ may be steadied against accidental movement in any convenient manner—as, for instance, by a spring mounted on frame-plate $a^8$, and so placed that the free end shall press against the sprocket-wheel $s'$ on shaft S.

Figures 10, 11, 12, 13:
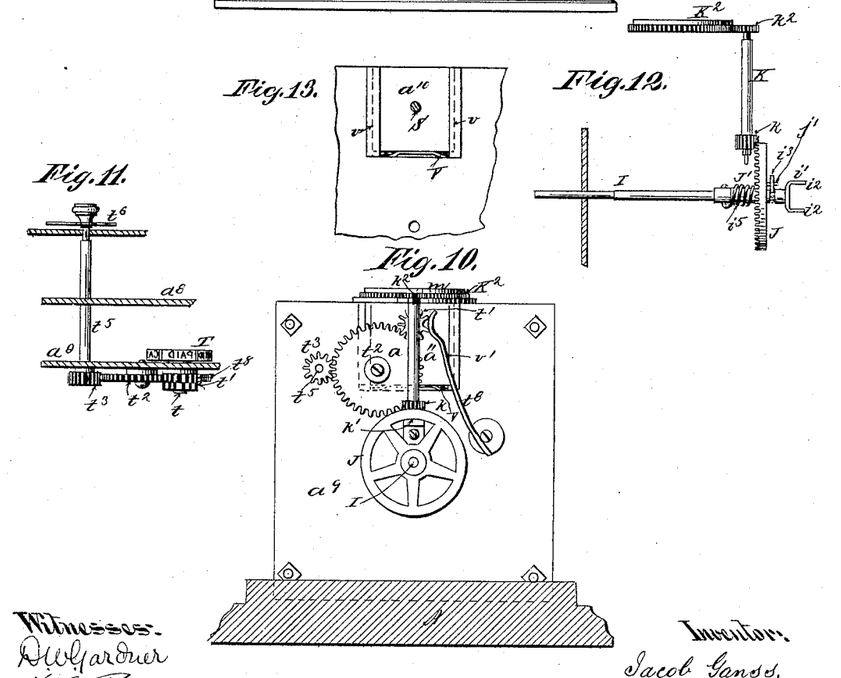
Fig. 10 is a rear elevation of Fig. 9.
Fig. 11 is a detail view of the canceling or descriptive printing-wheel and its index and intermediate connections.
Fig. 12 is a detail of minute-printing wheel and actuating mechanism.
Fig. 13 is a detail of my movable box-plate carrying shaft of printing-wheels.

Printing-wheel T is supported upon shaft $t$, projecting from frame-plate $a^9$. Its periphery may be provided with types to print any desired word, such as "paid" "filed." It is connected with small pinion $t'$, meshing with intermediate spur-wheel $t'$ and engaging with pinion $t^3$ upon end of shaft $t^5$, to outer end of which pointer $t^6$, Fig. 11, is attached, so adjusted relatively to the said types that when turned into coincidence with one of the words upon outer dial $t^7$ that word will be presented in position for printing upon T. Spring-detent $t^8$, bearing on pinion $t$, prevents accidental movement of wheel T and connections. The year-wheel U is also mounted independently upon stud $u$, projecting from frame-plate $a^8$, is held against accidental displacement by a spring-detent $u'$, has no connection with the remaining mechanism, and is turned by hand when necessary to change the year.

To facilitate withdrawal of printing-wheels, it is preferable to make removable sections $a^{10}$ $a^{11}$ $a^{13}$, sliding in grooves $v$ $v$ in frame-plates $a^8$ $a^9$ and front plate $a$, as shown in Figs. 1, 10, and 13. It is also preferable, to diminish strain and jar, that these sliding sections should be supported upon springs V V.

The operation of the mechanism will be readily understood from the foregoing description.

The various printing-surfaces are preliminarily arranged in the required position by suitably turning their aforesaid respectively-connected indexes, pointers, handles, &c., all from the exterior of the casing. Motive power is then applied to turn the shaft I once in each hour. The hour, minute, and day printing dials may then be automatically rotated by the mechanism and in the manner described, so as to print a correct record of the time. At the commencement of each year and month the corresponding printing-dials must be set in the required position by hand. The minute and fraction of a minute is indicated in the print by the relation of the minute-types on rotating dial $K^2$ relatively to fixed index W. If preferred, the printing-platen may be cut away or diminished in size, so as to cover and accordingly print only a few of the minute-type marks in the vicinity of the index-pointer.

The following advantages result from the use of the mechanism described. The movements of the printing-wheels and of their corresponding exterior indexes being synchronous, the matter to be printed may be readily determined. Again, danger of injury to the apparatus from jar is diminished by flexible coupling between shafts and also by spring-cushioning. Again, the combination of horizontally-rotating printing-dial with vertical rotating peripherally-typed printing-wheels, projecting so as to print within said dial, permits independent trains of gearing to produce required movements without interference and compacts the types and facilitates their automatic change. Again, by the use of the mechanism described, an independent train of gearing for each vertical peripherally-typed printing-wheel is dispensed with. The type-wheels are independently supported directly upon an axis around which they freely revolve. The wheels are independently actuated, and sleeving of them over each other or other connections between them are dispensed with. Again, the movement of the minute dial is continuous, and the apparatus therefore accurately prints fractions of a minute. On the other hand, the remaining type-wheels move intermittently only at proper periods and intermediately present constantly without motion the required type for printing.

Some of the advantages incident to the peculiar method of engaging the motor-wheel with the vertical type-printing wheels have already been described; but the engagement of the teeth of the motor-wheel in the notches of the printing-wheel by means of spring-pressure is also particularly advantageous, in that by properly spacing the said teeth and notches relative to the printed matter, as will be readily understood, the printing-wheel is prevented from resting in any position except one in which the types thereon shall be flatly and squarely presented to the platen. A rotary impulse having been imparted to the printing-wheel through the motor-wheel, the movement will continue until the particular tooth on the motor-wheel, which for the time being produces the rotation of the type-wheel, has passed the center-line between the two wheels and has come to rest upon the other side of such line. Again, the special pawl and sliding click mechanism described provides engagement with the teeth of the motor-wheel, which, while readily yielding and passing over the teeth when moved in one direction, when moved in the opposite direction presents an entirely rigid engaging surface bearing against and to actuate the teeth on the motor-wheel. Again, the vertical printing-wheels, being independently supported on their shaft, admit of movement backward and forward to a limited extent without derangement of the other portions of the mechanism, and thus, together with the remainder of the mechanism, are further insured against injury from the jar caused by the descent of the platen in printing. Again, the special form of joint or engagement device used between the two main shafts, while of unusually simple construction and affording a close and perfect union, admits of displacement to a very considerable extent without loss of union or contact.

What I claim as new, and desire to secure by Letters Patent, is the following, viz:

1. In a time-stamp, a type-bearing ring-shaped printing-dial rotating in one plane and in combination with such dial and projecting within the same, and a peripherally-typed wheel rotating in another plane substantially at right angles to the first, substantially as and for the purpose described.

2. The annular rotatable dial $K^2$ and the stationary central circular box $m$, formed with an aperture for the exposure of the peripheries of the printing-wheels underneath, in combination with said peripheral-printing wheels, substantially as and for the purpose described.

3. The combination of the peripherally-typed wheel $N^3$, rotating printing-dial wheel $K^2$, teeth upon said dial-wheel, stationary central box-bearing $m$, having aperture for the exposure of said peripherally-typed wheel, pinion $k^2$, meshing with teeth of $K^2$, pinion $k$, and crown-wheel J, attached to driving-shaft I, substantially in the manner and for the purpose specified.

4. The combination of a geared rotating printing-dial wheel $K^2$, a stationary central box-bearing $m$, having aperture for the exposure of peripherally-typed wheels underneath, pinion $k^2$, meshing with gears of $K^2$, shaft K, pinion $k$, sleeved crown-wheel J, projections $i^3$ $j'$, spring $i^5$, and shaft I, substantially in the manner and for the purpose specified.

5. In a time-stamp substantially such as described, a rotatory printing-wheel, the periphery of which is provided with printing-types and with intervening notches, in combination with a rotating toothed actuating-wheel mounted upon a yielding support, substantially as and for the purpose described.

6. In a time-stamp substantially such as described, a rotatory printing-wheel having its periphery provided with printing-types and intervening notches, in combination with a correspondingly-toothed rotating actuating-wheel having a yielding bearing and maintained in operative contact with said printing-wheel by spring-pressure, substantially in the manner and for the purpose described.

7. In a time-stamp substantially such as described, a rotatory printing-wheel having its periphery provided with printing-types and intervening small and shallow notches, in combination with a rotating actuating-wheel having yielding bearing and provided with teeth corresponding to said notches and maintained in operative contact with said printing-wheel by spring-pressure, substantially as and for the purpose described.

8. The combination of the driving-shaft I, disk O, projection $o'$, tripping-lever Q, spring $w'$, rock-shaft $Q'$, plate $q'$, and sliding pawl $q$ with the actuating-wheel R and printing-wheel R′, substantially as and for the purpose described.

9. The combination of the driving-shaft I, disk O, projection o′, tripping-lever Q, spring w′, rock-shaft Q′, and sliding pawl q with the actuating-disk R, provided with a tooth $r^2$, and the printing-wheel $N^3$, substantially as and for the purpose described.

10. In a time-stamp, the combination of a rotatory peripherally-typed printing-wheel, a rotating actuating-wheel R, rock-shaft Q′, tripping-lever Q, arm q′, spring w′, sliding pawl q, spring $q^2$, and rigid projection $q^5$, substantially as and for the purpose described.

11. In a time-stamp, the combination of a rotatory peripherally-typed printing-wheel, a rotating actuating-wheel R, rock-shaft Q′, spring w′, tripping-lever Q, arm q′, and sliding pawl q, and spring $q^2$, substantially as and for the purpose described.

12. In a time-stamp, the combination of a rotatory peripherally-typed printing-wheel, rock-shaft Q′, arm q′, slotted and sliding click q, having beveled edge, spring $q^2$, and motor-wheel R, the latter having teeth operating upon said bevel to slide backward said click and engage therewith alternately according to the movement of the rock-shaft, substantially as and for the purpose described.

13. The combination of rotating motor-wheel R, having tooth $r^2$ and rotating upon movable bearing carried by oscillating bracket r, with spring $r^5$, stud $r^7$, and rotatory peripherally-typed printing-wheel $N^3$, provided with notches $n^4$, substantially as and for the purpose described.

14. In a time-stamp, the combination of rotatory notched printing-wheel $N^3$, with rotating motor-wheel R, carrying actuating-tooth $r^2$, movable supporter $r^3$, and spring $r^5$, substantially as and for the purpose described.

15. In a time-stamp, the combination of a rotatory printing-wheel, provided with notches, with a rotatory actuating-wheel, provided with teeth engaging in said notches, one of said wheels being mounted upon a movable stud or bearing and held in operative position relative to the other wheel by means of spring-pressure, substantially as and for the purpose described.

JACOB GANSS.

Witnesses:
G. T. MIATT,
D. W. GARDNER.

Correction in Letters Patent No. 486,458.

It is hereby certified that in Letters Patent No. 486,458, granted November 22, 1892, upon the application of Jacob Ganss, of Brooklyn, New York, for an improvement in "Time-Stamps," an error appears in the printed specification requiring correction as follows: In line 74, page 4, the word "and" should be stricken out; and that the Letters Patent should be read with this correction therein that the same may conform to the record of the case in the Patent Office.

Signed, countersigned, and sealed this 17th day of January, A. D. 1893.

[SEAL.]

CYRUS BUSSEY,
*Assistant Secretary of the Interior.*

Countersigned:
 W. E. SIMONDS,
  *Commissioner of Patents.*